United States Patent
Lares

(10) Patent No.: US 9,323,369 B2
(45) Date of Patent: Apr. 26, 2016

(54) METHOD AND APPARATUS FOR PROCESSING TOUCH SIGNALS OF A TOUCHSCREEN

(71) Applicant: Roland Lares, Ulm (DE)

(72) Inventor: Roland Lares, Ulm (DE)

(73) Assignee: E. Solutions GmbH (DE)

( * ) Notice: Subject to any disclaimer, the term of this patent is extended or adjusted under 35 U.S.C. 154(b) by 0 days.

(21) Appl. No.: 14/321,478

(22) Filed: Jul. 1, 2014

(65) Prior Publication Data

US 2015/0015506 A1 Jan. 15, 2015

(30) Foreign Application Priority Data

Jul. 12, 2013 (DE) .......................... 10 2013 011 689

(51) Int. Cl.
*G06F 3/041* (2006.01)
*G06F 3/0488* (2013.01)

(52) U.S. Cl.
CPC .............. *G06F 3/041* (2013.01); *G06F 3/0488* (2013.01); *G06F 3/04886* (2013.01)

(58) Field of Classification Search
None
See application file for complete search history.

(56) References Cited

U.S. PATENT DOCUMENTS

| | | | |
|---|---|---|---|
| 2011/0316807 A1* | 12/2011 | Corrion | 345/174 |
| 2012/0032979 A1* | 2/2012 | Blow | G06F 1/626 345/647 |
| 2012/0062488 A1 | 3/2012 | Lin et al. | |
| 2012/0242617 A1* | 9/2012 | Lee | 345/174 |
| 2013/0234982 A1* | 9/2013 | Kang | 345/174 |
| 2013/0271447 A1* | 10/2013 | Setlur | G06F 1/626 345/418 |
| 2013/0285956 A1* | 10/2013 | Kamii et al. | 345/173 |
| 2014/0055367 A1* | 2/2014 | Dearman | G06F 3/0488 345/173 |
| 2014/0059478 A1* | 2/2014 | Dearman | G06F 3/04886 715/781 |
| 2014/0306905 A1* | 10/2014 | Kim | G06F 3/04886 345/173 |

* cited by examiner

*Primary Examiner* — Kent Chang
*Assistant Examiner* — Benjamin Morales Fernande
(74) *Attorney, Agent, or Firm* — Tarolli, Sundheim, Covell & Tummino LLP

(57) ABSTRACT

A technique is disclosed for processing touch signals of a touch-operable touchscreen. One aspect of the method comprises detecting a touch signal indicating a touch on the touchscreen, differentiating, on the basis of the detected touch signal, between an input touch for inputting information and/or for control purposes on the one hand and a gripping touch resulting from a user gripping the touchscreen on the other, and rejecting of the detected touch signal as an input touch if the touch signal is attributed to a gripping touch.

15 Claims, 4 Drawing Sheets

METHOD AND APPARATUS FOR PROCESSING TOUCH SIGNALS OF A TOUCHSCREEN

RELATED APPLICATIONS

The present invention claims priority from German Patent Application No. 102013011689.9, filed 12 Jul. 2013, the entirety of which is incorporated herein by reference.

TECHNICAL FIELD

In general terms, the present disclosure relates to a computer-implemented method for processing signals and an apparatus for carrying out this method. In concrete terms, the present disclosure relates to the processing of touch signals of a touch-operable touchscreen.

BACKGROUND

Many portable electronic devices are now equipped with a so-called touchscreen. In addition to displaying a graphic user interface, content and other information, the touchscreen also enables information to be input and the electronic device to be controlled by means of touch. Normally, the user of the electronic device can create an input by touching any point on the touchscreen on which information can be displayed.

For this purpose, the touchscreen contains a touch-sensitive touch pad, which is transparent so that the underlying display unit of the touchscreen remains visible to the user. The touch pad detects a touch on the touchscreen and generates a touch signal which generally reflects the position of the touch on the touchscreen. Known touchscreen technologies are based on resistive systems, capacitive systems, inductive systems or optical systems. Many touchscreens are also capable of detecting more than one touch at the same time and generating touch signals for a plurality of simultaneous touches ("Multi-Touch" or "In-Cell-Touch").

The development of electronic devices which are equipped with touchscreens is responding more and more to the aesthetic wishes of the user. In this regard, electronic devices with a very narrow housing edge are seen as particularly pleasing. Moreover, they provide a large display and operating area. However, this leaves a very narrow housing edge which often results in a user unintentionally touching the touchscreen simply through holding or gripping the electronic device and creating an input.

To avoid creating unintentional inputs with a touchscreen, it is known to selectively reduce the touch-sensitive area of a touchscreen which is available for the display. The Intel prototype HASWELL "North Cape" can be mentioned in this regard. This relates to a portable laptop computer with a keyboard on which a touchscreen is releasably mounted. When the touchscreen is released from the keyboard, the area available for the display is reduced automatically in a peripheral edge region. With this, the peripheral edge region is at the same time switched to non-touch-sensitive mode.

BRIEF SUMMARY

The present disclosure is based on the object of providing a method and a display apparatus which improve the operation of a touchscreen by touch and reduce the risk of false inputs.

According to one aspect, a computer-implemented method is disclosed for processing signals of a touch-operable touchscreen of a portable device. The method comprises detecting a touch signal indicating a touch on the touchscreen, differentiating, on the basis of the detected touch signal, between an input touch for inputting information and/or for controlling the portable device and a gripping touch as a result of the portable device being gripped in the region of the touchscreen, and rejecting the detected touch signal as an input touch if the touch signal is attributed to a gripping touch.

The differentiating can comprise determining at least one touch parameter from the detected touch signal. The at least one touch parameter indicates, for example, one or more of the following or other variables: a geometric variable of the touch, a time duration of the touch, a speed of movement of the touch and a pressure intensity of the touch.

Therefore, the at least one geometric variable can be the area of the touch, the number of touch points or the position of the touch on the touchscreen or a combination of these. The position of the touch on the touchscreen can be represented in the form of coordinates or other location indicators (e.g. in a coordinate system of the touchscreen).

Further, rejecting the detected touch signal can comprise rejecting the detected touch signal as an input touch for at least the area of the touch on the touchscreen. Alternatively or in addition to this, if touch signals have been detected for a number of particularly simultaneous touches, a particular touch or an associated touch signal of this number of touches can be rejected. For example, the touch signal can be rejected for a touch with the largest area. Alternatively or in addition to this, a touch signal can also be rejected for a touch with the longest duration.

Likewise alternatively or in addition to this, the method can also comprise detecting a further touch signal associated with a further touch on the touchscreen. The further touch takes place for example within a predefined or flexibly specified region located around the area of the touch on the touchscreen. The further touch signal can also be rejected as an input touch.

In an implementation variant, differentiating can comprise comparing the at least one determined touch parameter with a respective corresponding comparative parameter. To this end, the method can comprise determining a spatial orientation of the touchscreen. A spatial orientation of the touchscreen can be determined by means of a corresponding sensor. The spatial orientation comprises for example the user holding the touchscreen horizontally, the user holding the touchscreen at an angle or vertically and/or the user holding the touchscreen in such a way that a particular side of the touchscreen is aligned upwards or is positioned higher than another side of the touchscreen. Alternatively or in addition to this, the comparative parameter can be selected depending on the determined orientation.

Alternatively or in addition to this, differentiating can further be restricted to a touch signal which is attributed to a touch in the edge region of the touchscreen. The width of an edge region of the touchscreen can be for example between 10 and 35 mm, in particular 25 mm and preferably 20 mm from the edge of the touchscreen. As an alternative to this, the edge region can also occupy a particular percentage of the dimensions of the touchscreen. For example, the width of an edge region can make up between 2 and 12%, in particular 7% and preferably 5% of the total width or height of the touchscreen. The width of the edge region can also be given in pixels.

In a further implementation variant, the method can furthermore comprise altering the display on the touchscreen. The altering can occur alternatively or in addition to the step of rejecting the detected touch signal as an input touch if the touch signal is attributed to a gripping touch.

Furthermore, altering the display can comprise reducing the display around a region of the touch on the touchscreen or reducing the entire display. For instance, a proportional reduction in the overall display can be performed. Alternatively or in addition to this, altering the display can comprise a change in colour of the display at least in a region of the touch on the touchscreen. For example, the colour change can comprise a partially transparent representation of the display or a representation of the display with lighter colours, in grey tones or black.

Furthermore, reducing the display can comprise for example a proportional or non-proportional adaptation of the content represented on the display to a smaller region in a horizontal, vertical or horizontal and vertical direction. As an alternative to this, reducing the display can also comprise cutting the content represented. This represented content is then not visible or is not available for control purposes. The content can be general information, alphanumeric elements, graphic elements (e.g. a user interface), control elements of a graphic user interface, applications, videos, animations, web content, background images and/or a cursor.

Furthermore, the method can further comprise altering the input area of the touchscreen. The input area is the area or region of the touchscreen for which a touch signal is generated. For instance, by switching-off certain electrical lines of the touchscreen (or actually the underlying touch pad) or by omitting such electrical lines when sampling touch signals, the sensitivity of certain areas of the touchscreen is set to zero. Thus, a touch signal cannot be generated for these areas. This alteration can comprise a reduction in the input area around a region of the touch on the touchscreen or a proportional reduction of the overall input area. For example, the reduction in the input area can correspond to the reduction of the display.

The method can also furthermore comprise repeating the steps of detecting, differentiating and rejecting so long as a touch is detected. Detecting a touch can comprise a prolonged detection of a touch signal for a touch on the same point or an adjacent point.

According to a further aspect of the disclosure, a computer program product or a computer program with a program code for carrying out the method when the computer program product is run on a computer device is disclosed. The computer program product can be stored on a computer-readable recording medium.

Another aspect of the disclosure relates to an apparatus for displaying content. The apparatus can comprise a touchscreen for displaying content and for use by means of touch within an input region. The apparatus can furthermore comprise a processor system which is designed to carry out the method disclosed here for processing touch signals.

The apparatus can be contained in a portable device. This device can be a tablet computer. To this end, provision can be made for the tablet computer to be removably mounted in a vehicle. It would therefore be conceivable to mount the device on the rear of a driver or passenger seat. It is also possible to mount the device in the region of the dashboard on the driver or passenger side (or therebetween).

BRIEF DESCRIPTION OF THE DRAWINGS

Further aspects, advantages and details of the present disclosure are revealed in the description below of the exemplary embodiments in conjunction with the Figures, which show.

DETAILED DESCRIPTION

The present disclosure is explained with the aid of schematic flow diagrams and block diagrams. The technical teaching forming the basis of these diagrams can be implemented both in hardware and software or in a combination of hardware and software. These also include digital signal processors (DSP), application specific integrated circuits (ASIC) and other switching and computing components.

Figure 1:
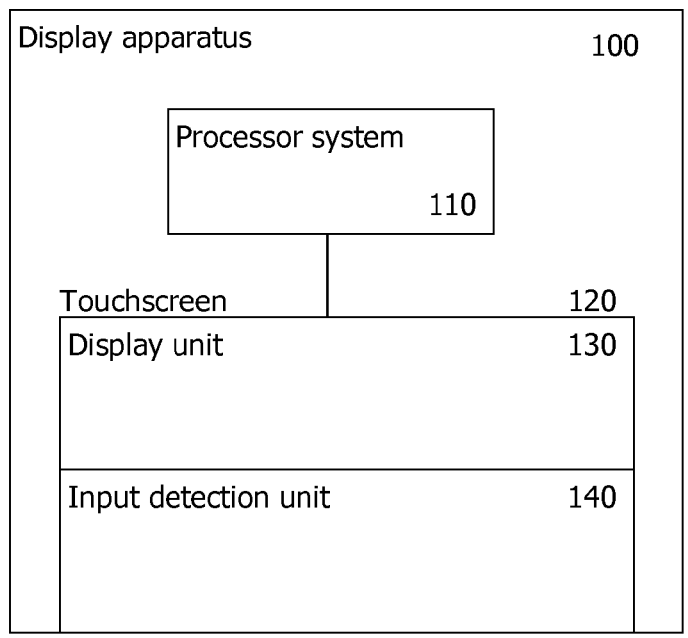
FIG. 1 a block diagram of an exemplary embodiment of a display apparatus.

According to one exemplary embodiment, the present disclosure relates to a display apparatus 100 for displaying content, which is shown schematically in a block diagram illustrated in FIG. 1. The apparatus 100 shown comprises a processor system 110 and a touchscreen 120. The processor system 110 is designed to implement the method described here for processing touch signals of the touchscreen 120 or particular steps thereof. The processor system 110 is coupled to the touchscreen 120 via a bus or other data line. The processor system 110 is thereby capable of receiving and transmitting signals and/or data to and from the touchscreen 120.

The touchscreen 120 comprises a display unit 130 and an input detection unit 140. The display unit 130 in turn comprises a display or display panel such as a liquid crystal display (LCD), an organic light emitting diode (OLED) display or a similar display.

The display unit 130 serves to display content on the touchscreen 120. This content can be information, alphanumeric elements, graphic elements, a user interface, control elements of a graphic user interface, applications, videos, animations, web content, background images and/or a cursor. The control elements include reduced and miniaturised applications, such as widgets.

The input detection unit 140 provides a touch-sensitive surface on the touchscreen 120. The input detection unit 140 can be a resistive, capacitive, inductive, optical or other touch detection unit. In general, the input detection unit 140 can comprise a touch pad with associated electronic control and signal processing components. The size of the input detection unit 140 can differ from the size of the display unit 130 (for example, the former can be larger).

The input detection unit 140 generates an electrical touch signal which can be transmitted for example to the processor system 110. In capacitive and inductive systems in particular, the touchscreen 120 does not have to be touched directly; instead a finger or object (e.g. a touch pen) can also be detected in the vicinity of the touchscreen 120.

The touch signal denotes for example a point on the touchscreen at which the touchscreen 120 is touched. For example, the touch signal reflects a (for example relative) position on the touchscreen 120 in the form of coordinates, a vector or similar position indicators.

In one variant, the input detection unit 140 is also capable of detecting several touches or touch positions ("multi touch"). With this, it is possible to generate and transmit a touch signal which reflects all touch positions. As an alternative to this, it is also possible to generate and transmit several touch signals, in particular a signal for each touch position.

Figure 2:
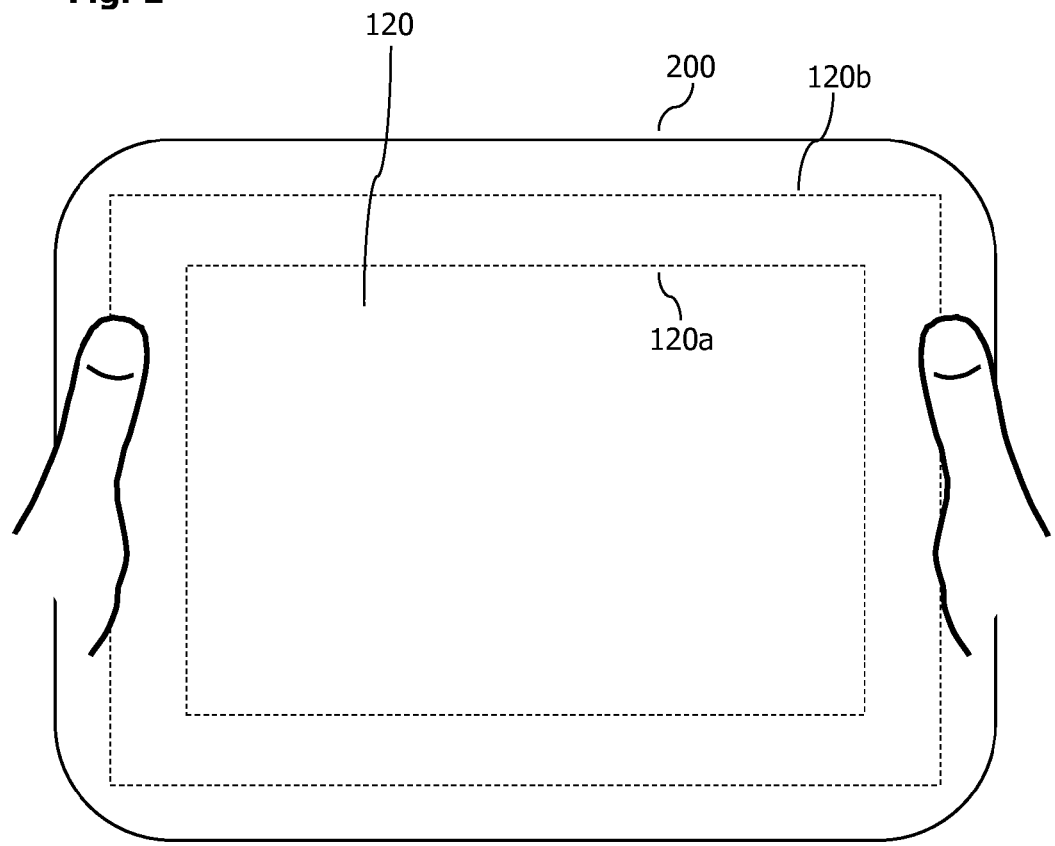
FIG. 2 a schematic view of a portable electronic device with a display apparatus with a touchscreen according to two exemplary embodiments.

The apparatus 100 can be contained for example in a portable electronic device, such as a tablet computer, a smartphone, a mobile navigation device, a laptop, etc. FIG. 2 shows a schematic view of a portable electronic device 200 of this type with a touchscreen 120.

For example, a touchscreen 120a, b of a particular size can be integrated in the electronic device 200. In FIG. 2, two alternative embodiments, each with a differently sized touchscreen 120a, b, are shown by dashed lines. In one embodiment, the electronic device 200 has a smaller touchscreen 120a. The electronic device 200 therefore has a wider housing edge. A larger touchscreen 120b is integrated in the alternative embodiment. This embodiment allows for a narrower housing edge. This enables the electronic device 200 to appear more elegant and provides a larger input area.

As shown by the illustrated thumbs of a user, gripping the portable electronic device 200 with the wide housing edge does not have an adverse effect on the touchscreen 120a. In this arrangement, the outer border of the touchscreen 120a, and therefore the display and input area, is at a sufficient distance away from the housing edge. As mentioned at the outset, on the other hand, making the housing frame narrower contributes greatly to improving the appearance of the portable electronic device 200. Therefore, electronic devices have been developed which contain the larger touchscreen 120b and have a narrower housing edge or frame around the touchscreen 120b.

However, as shown by the dashed lines, the user now grips the touchscreen 120b when holding the electronic device 200. Therefore, not only is the display area partially covered, but a touch signal is also generated by the touchscreen 120b and processed by the processor system 110. If, for example, a control symbol or other touch-operable graphic element is located in this touched region, the processor system 110 would carry out the underlying function of this element. For example, if this is an application symbol, then the processor system 110 would start an application.

A similar problem arises if a video film or similar program is running on the touchscreen 120b. The user can normally watch the film on the entire touchscreen area (display area). Touching the touchscreen often results in a menu being displayed, which enables the playback of the film to be controlled (e.g. pause, stop, fast forward, rewind etc.). In the case shown in FIG. 2 with the large touchscreen 120b, the user would constantly touch the touchscreen 120b with his thumb as a result of the gripping touch and thereby trigger a touch signal. The menu mentioned above for controlling playback would therefore be constantly displayed and would disturb the user when watching the film.

Although FIG. 2 shows two thumbs of the user by way of example, it is clear that the present disclosure is not limited to gripping with two thumbs. The present disclosure can apply equally to a single touch by any finger and to a number of touches or also a flat touch from other parts of the body, such as the heel of the hand.

The present disclosure provides a method and an apparatus which prevent or at least reduce such "false inputs". A corresponding method is shown schematically in the block diagram in FIG. 3. This method can also be implemented for example by the processor system 110 (FIG. 1) in connection with the larger touchscreen 120b (FIG. 2).

Figure 3:
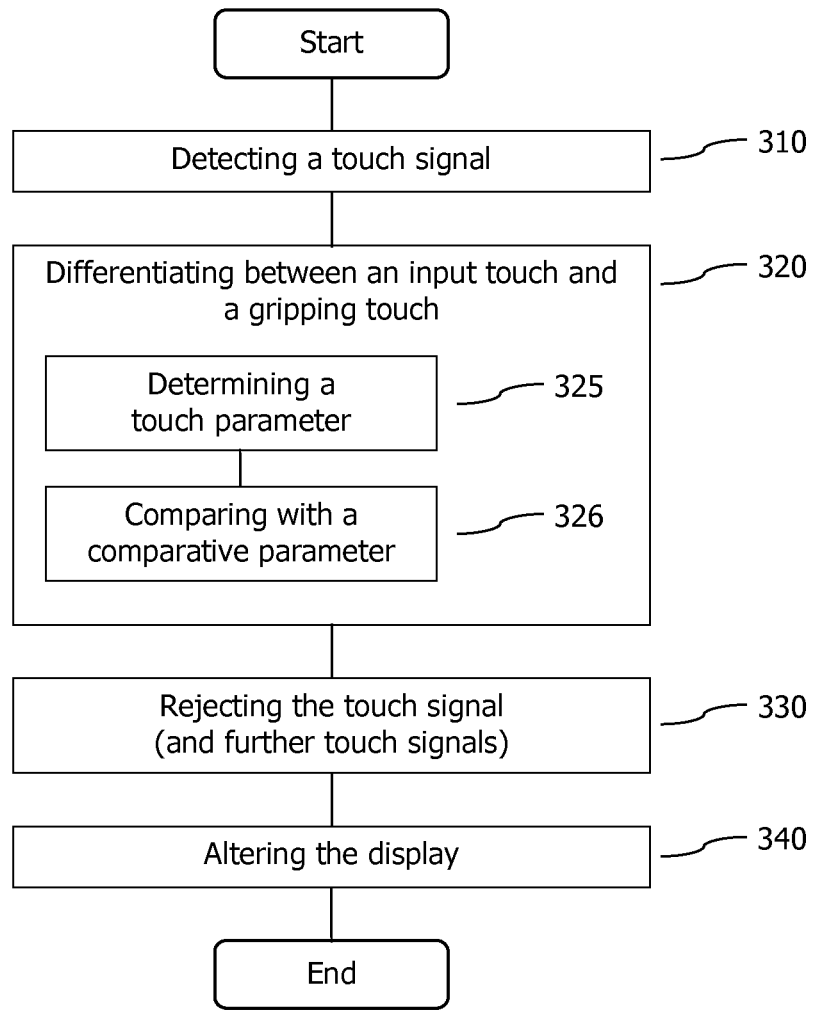
FIG. 3 a flow diagram of an exemplary embodiment of a method for processing touch signals.

The method for processing touch signals according to FIG. 3 begins with a step 310 of detecting a touch signal indicating a touch on the touchscreen 120. The touch signal can be attributed to the touchpad mentioned at the outset and reflect at least one touch parameter. The touch parameter can indicate one or more variables. These include a geometric touch variable, a time duration of the touch, a speed of movement of the touch and a pressure intensity of the touch. The geometric variable can be for example the area of the touch, the number of touch points or the position of the touch(es) on the touchscreen 120.

In the simplest form, the touch signal indicates a particular position, such as a coordinate or a pixel of the touchscreen 120. In the case of a coordinate, this can be any coordinate of any coordinate system on or within the touchscreen 120. In a further implementation variant, the touch signal for all intents and purposes comprises a plurality of coordinates or pixels. In this case, the touch signal would indicate an area or extent of the touch. Furthermore, the touch signal can indicate the coordinates or pixels of an outer margin of the touch. The processor system 110 would be able to derive both the position and the area of the touch from this.

A further touch parameter is the pressure intensity of the touch. This pressure intensity can also be given for each coordinate or pixel. The pressure intensity can furthermore also be given for the area of the touch. This can involve either an averaged pressure intensity or a distribution of the pressure intensity over the area for each coordinate or pixel.

A further step 320 of the method differentiates between an input touch and a gripping touch with the aid of the detected touch signal. An input touch is for example a touch for inputting information. The information can be input for example by briefly tapping (clicking) the touchscreen. Depending on the underlying application, it is also possible for a touch movement to be tracked and input as information, as is the case for example in image processing programs. A further form of input touch is an input for control purposes. This relates to touches on particular symbols, menu items or other elements of a graphic user interface in order to execute a particular function. A known function is clicking on an application symbol for opening the application or selecting a menu element from a menu. Likewise known control inputs are moving touches, for example for inputting a value by means of a displayed slide control (e.g. volume control).

The present disclosure differentiates a gripping touch, which takes place as a result of the user gripping (including holding) the touchscreen, from these input touches. For this differentiation, at least one touch parameter is firstly determined from the detected touch signal in step 325. As mentioned above, the at least one touch parameter refers to one or more variables.

In the case of the time duration of the touch and the speed of movement of the touch, the corresponding touch parameter can be determined from the signal of the input detection unit 140 for example by the processor system 110. To this end, the processor system 110 stores previous touch parameters and compares them with the touch parameters of newly detected touch signals. If there is a touch in the same position, the duration of the touch can be determined by the processor system 110. If the position changes over time, the speed of the associated touch can be determined by the processor system 110.

The input detection unit 140 can also already detect the time duration and/or speed of a touch as a touch parameter. This time-dependent touch parameter can then be incorporated in the touch signal and transmitted to the processor system 110 for further use.

The determined touch parameter is then compared with a comparative parameter in step 326. The result of this comparison is used to differentiate between an input touch and a gripping touch.

If the touch parameter is a geometric touch variable, such as the area of the touch, the number of touch points or a particular position of the touch on the touchscreen, a corresponding comparative parameter is also determined, which indicates a specified area, number or position.

Figure 4:
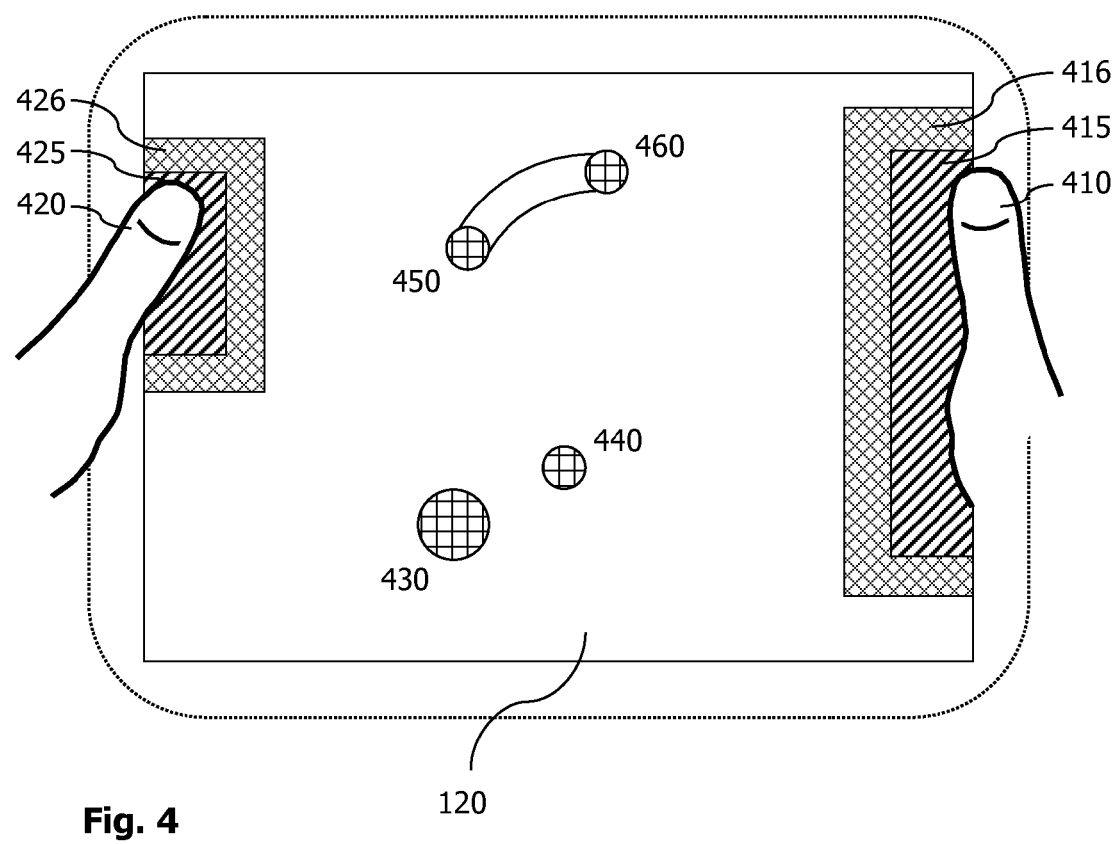
FIG. 4 a schematic view of a touchscreen with different input and gripping touches according to several exemplary embodiments.

This comparison is now explained in more detail by way of example with reference to FIG. 4. FIG. 4 represents different touches and associated touch areas on a touchscreen 120 schematically. In the right-hand region of FIG. 4, a gripping touch 410 by the right hand of the user is represented schematically. Since large parts of the thumb and the heel of the hand of the user are placed on the touchscreen 120, this touch or the touches have a relatively large area. This can be determined by the processor system 110 (FIG. 1) in that a number of touch signals of cohesive or connected coordinates or pixels of the touchscreen or a touch signal of one continuous touch are transmitted. The area of this touch by a thumb and heel of the hand is now compared with a comparative parameter for a touch area. In this case, it is assumed that the touch area is greater than the area forming the basis of the comparative parameter. Alternatively or in addition to this, the comparative parameter can also represent a particular geometric structure (typically planar or in outline), which is characteristic of the placement of one or more thumbs or heels of hands on a surface. This enables the touch by thumb and/or heel of the hand to be identified as a gripping touch.

The touch 420 in the left-hand region of the touchscreen 120 by the left thumb of the user is likewise compared with a corresponding comparative parameter of a touch area. A gripping touch can also be identified here by the size of the touch area and differentiated from an input touch.

Alternatively or in addition to the area, the position of the touch or the touch area can also be compared with a comparative parameter. If the touch/touch area is in a coordinate/pixel region within the edge region of the touchscreen 120, a gripping touch is identified. The width of the edge region can be specified in various ways. For example, the edge region of the touchscreen can be approximately 35 mm, in particular 25 mm and preferably 20 mm wide (in relation to the edge of the touchscreen). The edge region can also occupy a particular percentage of the dimensions of the touchscreen. For example, the width of an edge region can make up approximately 10%, in particular 7% and preferably 5% of the overall width or height of the touchscreen. The comparative parameter therefore specifies a particular width from the edge of the touchscreen.

A combination of these two parameters is likewise possible. For example, it is possible to examine whether the area of the touch meets (e.g. exceeds) a particular comparative parameter and whether the touch takes place in a particular region or a particular position on the touchscreen 120. An example of this: a further touch 430 in FIG. 4 is likewise relatively large in comparison with an exemplary touch parameter adapted to the touch 440. Therefore, the touch 430 would likewise be detected as a gripping touch when compared with the comparative parameter. However, since the touch 430 is not in the edge region of the touchscreen 120 (specified by a corresponding comparative parameter for the touch position), the touch 430 is not identified as a gripping touch. This relates accordingly to an input touch. On the other hand, the touch 440 can be identified as an input touch on the basis of its small area alone.

In a further implementation variant, it is alternatively or additionally possible to take into account a touch parameter which indicates the time duration of the touch. It is assumed that the touches 410 and 420 have a relatively long duration, for example longer than two seconds. It is to be understood that a time-based comparative parameter can also reflect a different duration, such as 1 second, 5 seconds, 10 seconds etc. If the duration of the touch exceeds the time duration specified by the corresponding comparative parameter, this touch is identified as a gripping touch.

A combination of different touch parameters for differentiating between an input touch and a gripping touch is also possible. For example, the touch 450 can be moved to the touch position 460. With this, the user leaves the finger or object (e.g. a touch pen) on the touchscreen 120 during the entire movement. If the duration of the touch 450, 460 is only compared with a time-based comparative parameter, the touch 450, 460 would be identified as a gripping touch. However, if the positions of the touches 450 to 460 on the touchscreen 120 are compared, these are identified as an input touch. A further differentiation criterion would also be the extent of the touch 450, 460, which identifies this touch as an input touch. For example, the touch 450 and 460 can be smaller than a corresponding comparative parameter for a touch area.

A further touch parameter can indicate the speed of movement of the touch. Again, with reference to the touch 450, 460, it is possible to calculate a speed or acceleration of the movement of the touches from 450 to 460. If this speed or acceleration exceeds a predetermined value of a comparative parameter, the moving touch 450, 460 can be identified as an input touch. It is likewise possible for one of the touches 410 and 420 to move slightly (e.g. due to a natural wobble) and for an associated speed or acceleration to be calculated from this. The speed here is however less than the predetermined value of the corresponding comparative parameter, which means that the touches 410 and 420 can be identified as a gripping touch.

Finally, the pressure intensity of the touch can be compared with a predetermined value of a corresponding comparative parameter. For example, one of the touches 410 and 420 can be different from (e.g. stronger than) the touches 430 to 460 since the user is holding the portable device firmly. Therefore, if the transmitted pressure intensity exceeds a predetermined value, for example, it is identified as a gripping touch.

Again with reference to FIG. 3, the detected touch signal is rejected as an input touch in a further step 330 if the touch signal is attributed to a gripping touch. For example, the processor system 110 would reject the touch signals of the touches 410 and 420 (FIG. 4) identified as a gripping touch, i.e. it would not use them for inputting information and/or for control purposes.

Since a gripping touch can also move, as addressed above, it is possible to adapt the region in which touch signals are rejected. In the most simple case, the region in which touch signals are rejected would be the region which corresponds to the touch area itself. As an alternative to this, the region can be increased (e.g. proportionally corresponding to the shape of the touch). It is likewise also possible to use a region of a predetermined shape to reject touch signals. For example, a rectangular region 415 and 425 is shown in FIG. 4. This rectangular region 415 and 425 is selected to be large enough to surround the detected touch. It is to be understood that it is also possible to use any other shape instead of a rectangle.

To account for a relatively large movement of the gripping touch, the region in which touch signals are rejected can be increased even further. This is shown in FIG. 4 by the regions 416 and 426. Touches which take place in this region, or their underlying touch signals, can likewise be rejected. Touch signals in the regions 416 and 426 can also be compared with more restrictive comparative parameters to differentiate them from a gripping touch. For example, a very brief touch (e.g.

<0.5 sec.) in one of the regions 416 and 426 can be evaluated as an input touch. On the other hand, a touch with a longer duration (e.g. >0.5 sec. or >1 sec) would be identified as a further gripping touch.

In a further implementation option, the comparative parameter can also be selected with reference to a spatial orientation of the touchscreen. To this end, the processor system 110 (FIG. 1) is able to determine the spatial orientation of the touchscreen. This can take place for example with the aid of a sensor (not shown). A comparative parameter can therefore be adapted or selected depending on a horizontal, vertical or angled position of the touchscreen. It is likewise possible for a comparative parameter to be selected according to which of the sides of the touchscreen point upwards, downwards, to the right or to the left. This spatial orientation of the touchscreen is particularly helpful for identifying a right and left edge region. Most users might hold a touchscreen 120 with their hands on the left and/or on the right. With a horizontal alignment of the touchscreen, it is also conceivable that the touchscreen lies on the palm of the user, whilst the thumb holds (grips) the touchscreen in the lower edge region. Accordingly, the edge regions would only be specified in the right and left edge region or only in the lower edge region in order to identify a gripping touch.

Again with reference to FIG. 3, the display on the touchscreen 120 is altered in an optional further step 340. An alteration to the display can be carried out for example if a gripping touch has been identified. Possible alterations to the display on the touchscreen 120 are shown schematically in FIGS. 5a to 5c.

FIG. 5a again shows a schematic view of a mobile electronic device 200 with a touchscreen 120 which is held with two hands on the right and/or the left. In this exemplary embodiment, the display is reduced by a respective edge region of the touchscreen 120. Since the gripping touch(es) are on the right and/or the left of the touchscreen 120, a region which extends over the entire vertical extent of the touchscreen 120 is excluded from the display. The display is reduced by these two regions.

The reduction in the display can be realised in different shapes. For example, the shaded regions shown in FIG. 5a, can be represented in black whilst the content of the entire display of the touchscreen 120 is adapted to the other (unshaded) region. As an alternative to this, it is also readily possible to cut the shaded regions from the underlying content. As soon as the user releases the gripping touch, the corresponding region is re-presented again.

Figure 5A:
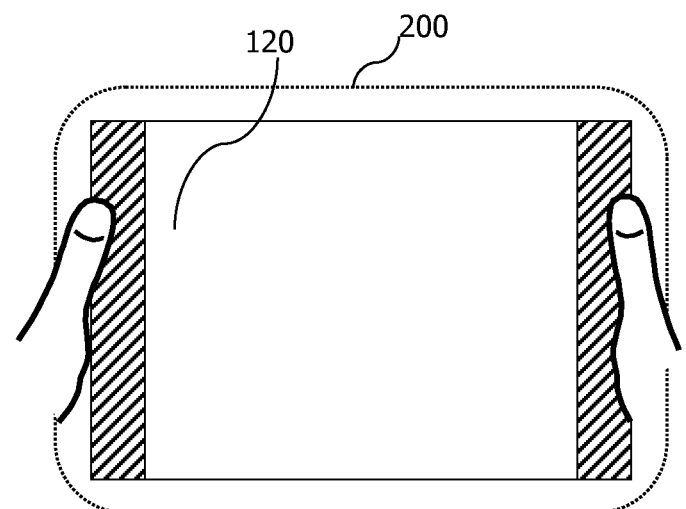
FIGS. 5*a*-5*c* schematic views of an altered display on a touchscreen according to several exemplary embodiments.

In a further exemplary embodiment, the shaded region or regions shown in FIG. 5a are represented semi-transparently. The user therefore has the option of seeing the underlying content. However, as a result of the semi-transparency, the user is at the same time aware that input touches are not possible in these regions.

Figure 5B:
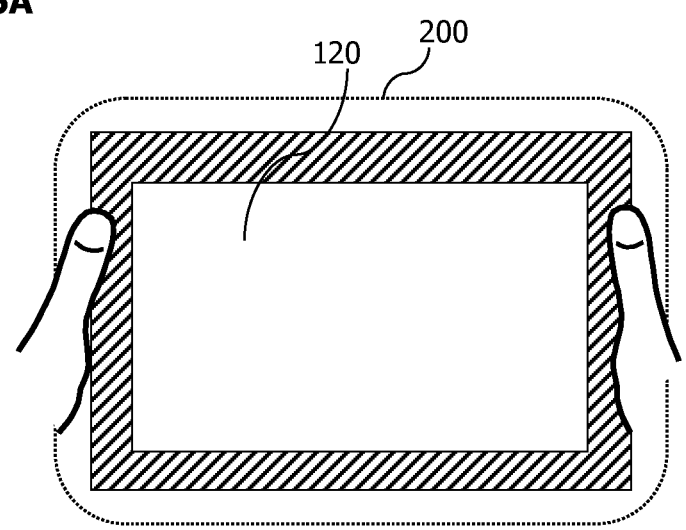

In a further implementation variant shown in FIG. 5b, the display is reduced proportionally. In other words, the content of the entire display is reduced proportionally to the unshaded region shown in FIG. 5b. This enables the original proportions of the content to be maintained. The gripping touch(es) or the larger of several gripping touches here designates by which factor the content on the display is reduced. This variant is particularly advantageous for watching video films. The user can hold the electronic device whilst the entire film can be watched without being cropped or compressed. It is to be understood that the proportional reduction can be altered dynamically if the gripping touch changes. This variant can also be applied to the embodiments according to FIGS. 5a and 5c.

The reduction of the display has the further advantage that there are no object, items, etc. on the touchscreen which could be the aim of an input touch. Thus, the user most likely will not touch the touchscreen in the respective region(s) in order to perform an input as there is no display. This improves the overall method, since the number of touches in or around a gripping touch will be reduced.

Figure 5C:
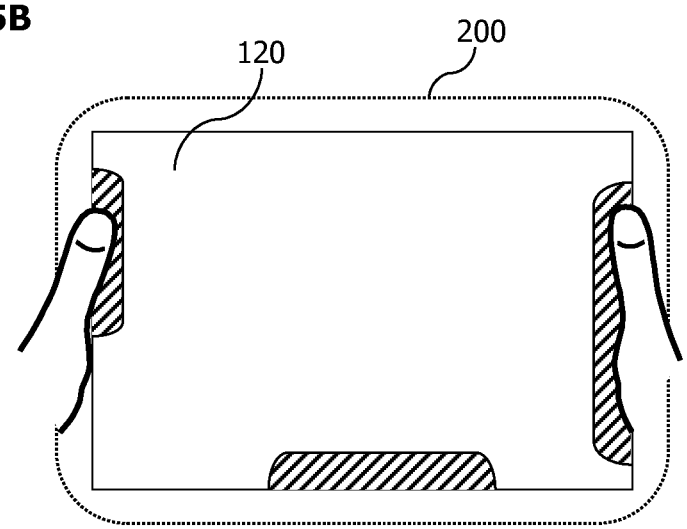

A further implementation variant is shown in FIG. 5c. In this, particular gripping regions or touch regions are shown semi-transparently. These regions are adapted to the shape of the gripping touch. It is also possible to use shapes such as rectangles or semi-ellipses. By way of example, FIG. 5c shows a rectangular shape with smoothed corners, which is adapted to the size of the respective gripping touch. By way of example, the shaded region illustrated at the lower edge in FIG. 5c shows a gripping region when the user holds (grips) the electronic device only at the lower edge.

In all embodiments according to FIGS. 5a to 5c, instead of a semi-transparent representation, it is also possible to use another colour scheme, lighter colours, grey tones or the like in order to make the user aware of the regions in which touch signals will be rejected as an input touch.

In addition or alternatively to the alteration of the display, the input area of the touchscreen can be altered. The input area is the area or region of the touchscreen for which a touch signal is generated. For instance, by switching-off certain electrical lines of the touchscreen (or actually the underlying touch pad) or by omitting such electrical lines when sampling touch signals, the sensitivity of one or more certain areas of the touchscreen is set to zero. Thus, a touch signal cannot be generated for the certain area(s). This alteration can comprise a reduction in the input area around a region of the touch on the touchscreen, such as the regions illustrated in FIGS. 5a and 5c. On the other hand, a proportional reduction of the overall input area can be conducted, such as the reduction illustrated in FIG. 5b. Furthermore, the reduction in the input area can correspond to the reduction of the display.

The present disclosure therefore provides a method and a display apparatus which enable an electronic device with a touchscreen to be gripped and operated at the same time, without significant erroneous functions or false inputs occurring. In particularly efficient manner, the present disclosure can be implemented in relation to a tablet computer.

By means of the disclosure presented here, when the tablet computer is removed from a holder provided for it or is subsequently held, it is possible to prevent this from being erroneously identified as an input touch. Amongst other things, this enables the prevention of security-critical false inputs.

According to one variant, the tablet computer is removably mounted in a motor vehicle. It can be mounted in a holder on the rear side of a seat (e.g. a driver or passenger seat). Alternatively or in addition to this, it is also conceivable for it to be mounted in a holder in the region of the dashboard on the driver or passenger side or therebetween.

The invention claimed is:

1. A method for processing signals of a touch-operable touchscreen of a portable device, wherein the method comprises:
   detecting a first touch signal indicating a first touch on the touchscreen;
   identifying a touch region of the touchscreen corresponding to an area of the first touch on the touchscreen;
   differentiating, on the basis of the detected first touch signal, between an input touch for at least one of inputting information and controlling the portable device and a gripping touch as a result of the portable device being gripped in the touch region of the touchscreen, wherein differentiating comprises determining a first touch parameter from the detected first touch signal, and comparing the determined first touch parameter with a corresponding first comparative parameter;

rejecting the detected first touch signal as an input touch when the first touch signal is attributed to a gripping touch;

altering the display of the touchscreen, wherein altering comprises reducing one of the display around the touch region and the entire display;

increasing the touch region;

detecting a second touch signal associated with a second touch on the touchscreen, wherein the second touch takes place within the increased touch region;

differentiating, on the basis of the detected second touch signal, between an input touch and a gripping touch, wherein differentiating comprises determining a second touch parameter from the detected second touch signal, and comparing the determined second touch parameter with a corresponding second comparative parameter, the second comparative parameter being more restrictive than the first comparative parameter; and rejecting the second touch signal as an input touch when the second touch signal is attributed to a gripping touch.

2. The method according to claim 1, wherein the first and/or second touch parameter indicates one or more of the following variables: at least one geometric variable of the touch, a time duration of the touch, a speed of movement of the touch and a pressure intensity of the touch.

3. The method according to claim 2, wherein the at least one geometric variable is selected from the area of the touch, the number of touch points and a position of the touch on the touchscreen.

4. The method according to claim 3, wherein rejecting the detected first touch signal comprises rejecting the detected first touch signal as an input touch for at least the area of the touch on the touchscreen.

5. The method according to claim 1, further comprising:
determining a spatial orientation of the touchscreen, wherein the first and/or second comparative parameter is selected depending on the determined orientation.

6. The method according to claim 1, wherein differentiating is restricted to a touch signal which is attributed to a touch in the edge region of the touchscreen.

7. The method according to claim 1, further comprising:
altering the input area of the touchscreen.

8. The method according to claim 7, wherein altering comprises reducing one of the input area around the touch region and the entire input area.

9. The method according to claim 7, wherein altering comprises a change in colour of the display in the touch region.

10. The method according to claim 9, wherein the change in colour comprises a partially transparent representation of the display or a representation of the display with lighter colours, in grey tones or black.

11. The method according to claims 1, further comprising:
repeating the steps of detecting, differentiating and rejecting, so long as a touch is detected.

12. A non-transitory computer-readable medium encoded with a computer program for carrying out, when the computer program is run on a computer device, a method for processing signals of a touch-operable touchscreen of the computer device, wherein the method comprises:

detecting a first touch signal indicating a first touch on the touchscreen;

identifying a touch region of the touchscreen corresponding to an area of the first touch on the touchscreen;

differentiating, on the basis of the detected first touch signal, between an input touch for at least one of inputting information and controlling the portable device and a gripping touch as a result of the computer device being gripped in the touch region of the touchscreen, wherein differentiating comprises determining a first touch parameter from the detected first touch signal, and comparing the determined first touch parameter with a corresponding first comparative parameter;

rejecting the detected first touch signal as an input touch when the first touch signal is attributed to a gripping touch;

altering the display of the touchscreen, wherein altering comprises reducing one of the display around a region of the touch on the touchscreen and the entire display;

increasing the touch region;

detecting a second touch signal associated with a second touch on the touchscreen, wherein the second touch takes place within the increased touch region;

differentiating, on the basis of the detected second touch signal, between an input touch and a gripping touch, wherein differentiating comprises determining a second touch parameter from the detected second touch signal, and comparing the determined second touch parameter with a corresponding second comparative parameter, the second comparative parameter being more restrictive than the first comparative parameter; and rejecting the second touch signal as an input touch when the second touch signal is attributed to a gripping touch.

13. An apparatus for displaying content, comprising:
a touchscreen for displaying content and for use by means of touch within an input region; and a processor system which is designed to carry out a method for processing signals of the touchscreen, wherein the method comprises:

detecting a first touch signal indicating a first touch on the touchscreen;

identifying a touch region of the touchscreen corresponding to an area of the first touch on the touchscreen;

differentiating, on the basis of the detected first touch signal, between an input touch for at least one of inputting information and controlling the portable device and a gripping touch as a result of the apparatus being gripped in the touch region of the touchscreen, wherein differentiating comprises determining a first touch parameter from the detected first touch signal, and comparing the determined first touch parameter with a corresponding first comparative parameter;

rejecting the detected first touch signal as an input touch when the first touch signal is attributed to a gripping touch;

altering the display of the touchscreen, wherein altering comprises reducing one of the display around a region of the touch on the touchscreen and the entire display;

increasing the touch region;

detecting a second touch signal associated with a second touch on the touchscreen, wherein the further second touch takes place within the increased touch region;

differentiating, on the basis of the detected second touch signal, be-tween an input touch and a gripping touch, wherein differentiating comprises determining a second touch parameter from the detected second touch signal, and comparing the determined second touch parameter with a corresponding second comparative parameter, the second comparative parameter being more restrictive than the first comparative parameter; and rejecting the second touch signal as an input touch when the second touch signal is attributed to a gripping touch.

14. A portable device comprising the apparatus according to claim 13.

15. The portable device according to claim 14, which is constructed as a tablet computer, in particular for use in a motor vehicle.

* * * * *